United States Patent [19]

Sperberg

[11] 3,807,475

[45] Apr. 30, 1974

[54] BIAS PLY TIRE WITH CARCASS REINFORCEMENTS

[76] Inventor: Lawrence R. Sperberg, 6740 Fiesta Dr., El Paso, Tex. 79912

[22] Filed: Mar. 16, 1973

[21] Appl. No.: 342,281

Related U.S. Application Data

[63] Continuation of Ser. No. 125,440, March 17, 1971, abandoned, which is a continuation of Ser. No. 695,900, Jan. 5, 1968, abandoned, which is a continuation-in-part of Ser. No. 631,245, April 17, 1967, abandoned.

[52] U.S. Cl. .......................... 152/356, 152/DIG. 19
[51] Int. Cl. .............................................. B60c 9/06
[58] Field of Search.. 152/361 R, 354, 356, DIG. 19

[56] References Cited
UNITED STATES PATENTS

| 1,165,630 | 12/1915 | Seward, Jr. | 152/DIG. 19 |
| 3,068,926 | 12/1962 | Jacob et al. | 152/DIG. 19 |

FOREIGN PATENTS OR APPLICATIONS

| 1,231,111 | 9/1960 | France | 152/356 |

Primary Examiner—Gerald M. Forlenza
Assistant Examiner—George H. Libman
Attorney, Agent, or Firm—Marcus L. Bates

[57] ABSTRACT

A method of imparting structural rigidity to the ply structure of a pneumatic tire which includes determining the existing geometrical designs formed by the various superimposed cords of the adjacent and subadjacent individual plies, in order to enable the addition of one or more plies to the in existing designs in an area where the tire exhibits the greatest susceptibility to failure, or to an existing area where the resulting forces exerted by the individual cords are desired to be changed whereupon various desirable stability characteristics are imparted to the tire.

This method of changing the geometrical patterns formed by the individual cord paths of the tire plies enables the design of nondirectional, unidirectional, symmetrical, and asymmetrical tires to be carried out, as well as imparting various degress of directional stability to a tire. The method of the present invention enables the fabrication of light weight, cooler running tires having optimum arranged cord paths and an absence of redundant structure within the tire.

9 Claims, 12 Drawing Figures

INVENTOR.
LAWRENCE R. SPERBERG
BY
MARCUS L. BATES

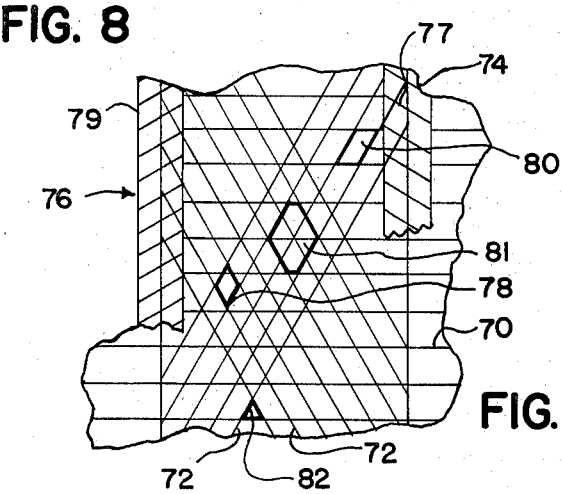
FIG. 8
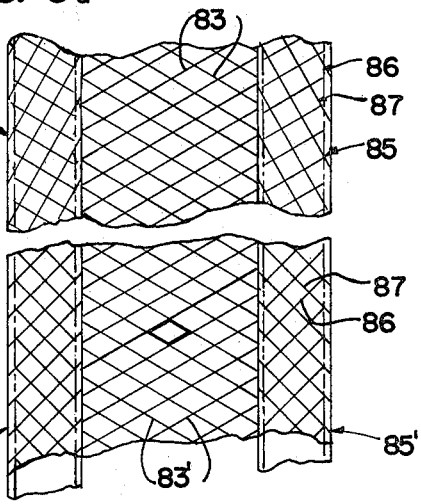
FIG. 9a
FIG. 9b
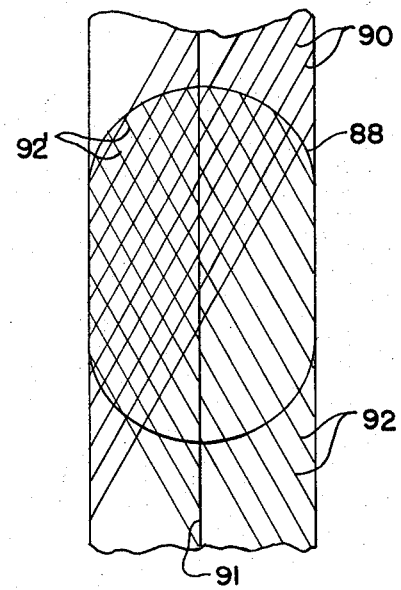
FIG. 10
FIG. 11
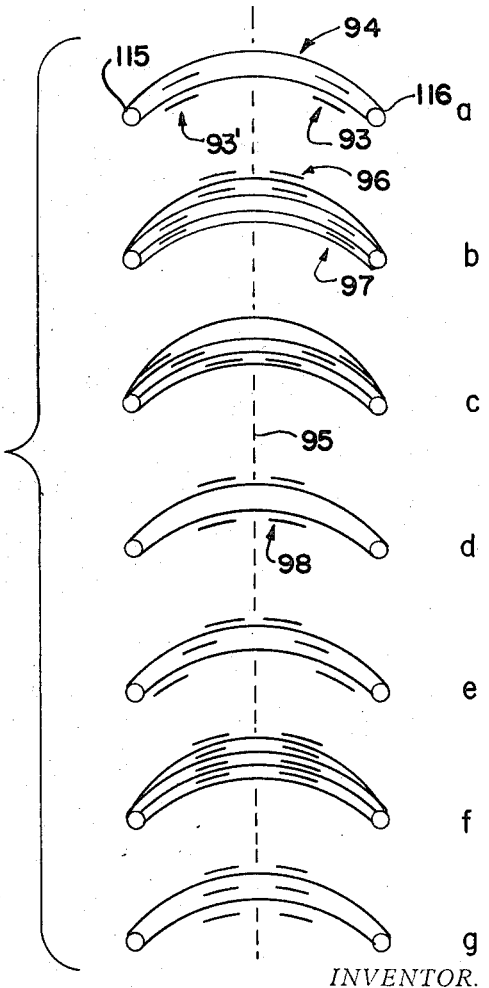

BIAS PLY TIRE WITH CARCASS REINFORCEMENTS

CROSS REFERENCES TO RELATED APPLICATIONS

This application is a continuation of Ser. No. 125,440, filed Mar. 17, 1971 and now abandoned, which is a continuation of Ser. No. 695,900, filed Jan. 5, 1968 and now abandoned, which is a continuation-in-part of Ser. No. 631,245, filed Apr. 17, 1967 and now abandoned.

BACKGROUND OF THE INVENTION

Tire design depends upon the contemplated utility or the type of work to which the tire is subjected. The work to be performed dictates the ply structure which in turn governs the bulk or thickness of the tire. Truck tires carry greater weight than passenger tires and therefore must be bulkier or stronger in design. The strength of the bias constructed tire is generally calculated by multiplying the number of plies contained within the tire by the number of cords per inch of each ply which in turn is multiplied by the average strength of the individual cord. As the strength of the tire is increased in order to meet the demand of greater applied loads, the operating temperature of the tire also increases. The increase in temperature is evidenced by a corresponding increase in the temperature of the air contained within the air chamber as well as a higher internal shoulder temperature. The increased operating temperature is attributed to the heat insulating characteristics of the cord and rubber mass from which the tire is fabricated. Accordingly, an increase in the cord-rubber mass increases the insulating properties of the tire which in turn produces an elevated contained air and internal shoulder temperature, although the flexing action of the bulkier tire may be considerably less than the lighter weight, less bulky tire.

To avoid contradiction, it should be noted that thinner tires dissipate heat more readily, and hence run cooler only when the deflection remains constant when comparing 2 and 4 ply tires with each other.

As used throughout this specification, the term ply or plies is intended to include one or more built-up layer of fiber-like material, each of which is tied to the tire beads in a manner to suitably support the tread wearing compound. Mini-ply or mini-plies include spaced apart narrow reinforcing strips fabricated from fiber-like filaments. Each of the strips forming the mini-ply is spaced apart from one another and from each of the spaced apart beads. In this specification the term "elements of the tire body" include the rubber compounds employed, the cord, the cord surface treatment that helps to bond the rubber insulation compound to the cord itself, the tread compound itself, and the liner compound or inner tube whose initial main objective is simply to contain the gaseous inflating agent. Tire compounds include the various chemicals which are mixed together to make up the individual elements of the tire. Cord, tire cord, and cords of the ply refer to the individual treads or filaments which are joined together in a manner to provide a fabric or fabric-like material wherein the fabric is also referred to as the "ply fabric." The first ply is the innermost or the ply nearest adjacent to the air chamber of the tire. Ply structure is the resulting geometry as viewed when one ply is superimposed upon one or more additional plies. Breaker, girdle, and belt are the ply-like materials which extend across the crown of the tire and which are spaced apart from the beads. These elements are used to modify the existing plies by complicating its geometry and are usually comprised of two or more layers of fabric-like material. The term work indicates the actual horespower delivered to the spaced apart beads of a tire, while torque is intended to include the actual force exerted at the tread surface of the tire, unless specifically stated to the contrary.

The contained air temperature of a tire is directly related in a straight line function to the applied load. The contained air temperature is also a straight line function of the rotational velocity of the tire. Thus, an increase in applied loads and speed result in an increase in the contained air temperature of any specific tire. Since the contained air temperature is also a function of the insulating characteristics of the rubber cord mass it is evident that the temperature due to the applied load and speed is additive to the temperature due to the insulative property of the tire.

Whenever the contained air temperature of a pneumatic tire approaches 250° F., the tire becomes susceptible to early failure because it undergoes rapid deterioration. The failure may be attributed to the additive effects of oxidation and fatigue acting upon the various elements of the tire in addition to a lowering of the endurable limits of stress of these elements.

Thus, every tire has a practical top limit which the contained air temperature must never exceed if satisfactory performance is to be derived therefrom. The only expedient left which enables the tire design enginner to avoid this temperature is to decrease the insulative effect or bulk factor of the tire which in turn compensates for the increased operating heat brought about by the gradually increasing vehicle speeds. The alternative solution of decreasing the permissible applied lead for a particular sized tire has not been commercially or politically palliative.

Several developements have occurred during the past two decades to alleviate the problem of heat build up in pneumatic tires. The major developments have occurred primarily in the area of improved strength tire cords and new tire cord materials. In the table below are listed several tire cord materials with pertinent descriptive properties.

TABLE I

| CORD | TENACITY (GRAM/ DENIER) | SINGLE YARN | IMPACT ENERGY om/kg | BENDING STIFFNESS cm/g | ELONG. AT 20% OF BREAKING LOAD |
|---|---|---|---|---|---|
| Rayon 1950 | 2.6 | — | — | — | — |
| Rayon 1965 | 4.7 | 6.0 | 730–1700 | 25–100 | 0.5–0.9 |
| Nylon 1952 | 6.0 | — | — | — | — |
| Nylon 1965 | 7.9 | 9.0 | 1800 | 17 | 5.0 |
| Polyester 1958 | 5.1 | — | — | — | — |
| Polyester 1965 | 6.7 | 8.9 | 1400–1800 | 30–700 | 1.0–1.9 |
| Steel | 2.4 | — | 230 | 1400 | 0.4 |

As stated above, the calculated tire strength is the product of cords per inch times the number of plies times the strength of the individual cord. The strength of any cord is the product of its basic strength per denier multiplied by the number of deniers in the particular cord. The denier of a cord is a measure of the cord fineness and is defined as the size of the cord resulting from 0.05 gram of material being stretched to 450 meters in length. As the cord denier increases, the strength of the individual cord increases, but fewer cords per inch can be realized because of the larger cord.

When nylon tire cord was first made available commercially the increase in nylon's basic strength was used to increase the calculated strength of tires. The number of plies used in the various type tires was left unchanged. The most widely used tire cord material prior to the development of nylon was rayon and since the nylon cord was slightly smaller dimension-wise than rayon, a slight decrease in bulk factor was realized because the gauge of the rubber insulation compound could be decreased slightly while still ensuring adequate insulation between adjacent cords in the same ply and between the cords of adjacent plies.

Over the years both nylon and rayon tire cords were inproved in their basic inherent strength as a consequence of intensive research and development work, and this improvement in strength was utilized in reducing the number of plies in the tires while still maintaining the same tire strength in order to reduce the bulk factor which in turn reduced the heat insulation value because of the reduced tire body thickness.

Special attention is directed to the bending stiffness of the various tire cord materials, particularly nylon. Nylon's extremely low bending stiffness is the source of a major flexing problem first evident in truck tires in the late 1950's, when nylon first came into widespread use.

Simultaneously with the improvement in the basic inherent strength of both nylon and rayon tire cords, a further step was taken to reduce the bulk factor of tires by reducing the number of plies while still maintaining the same calculated tire strength by increasing the denier of the cords used. This approach in tire engineering resulted in two ply-four ply rated passenger tires, and the four ply-twelve ply rated conventional large sized truck tires, which are but two of the many types of reduced ply tires manufactured. These reduced ply tires suffered no reduction in calculated tire strength, and had the added advantage of thinner tire bodies which permitted more rapid dissipation of heat due to the lowered heat insulative value of the reduced cord - rubber mass Concurrently with the above stated developments, new tire cords of different chemical composition were being developed along with the tire construction principles, notably the radial tire.

Radial ply tires, both truck and passenger types, have been produced for many years in Europe, where the vehicles are small and the occupant's taste and riding habits differ from those of the U.S.A. The power capabilities of the European vehicle are much lower than those of the United States. The radial tires of the prior art offer many advantages over the conventional or biased constructed tire, including an improvement of upwards to twice the tread life, substantial increased gas mileage or lower horsepower consumption, increased puncturing resistance, and reduced nibbing. On the other hand, the radial tire is more difficult to manufacture, causes higher noise levels, and gives a less comfortable ride. The handling characteristics of the tire differs from the conventional tire in that abrupt transistions occur at certain speeds.

In radial ply tire the carcass cords run 90° to the circumferential center line and support a belt or breaker ply about the outer periphery of the radial plies. The plies of the belt are fabricated of cords at a very low angle (10° to 20°). The radial ply construction causes the tire to have a low spring rate while the belt improves the directional stability. The belt also provides for increased harshness, or poor riding characteristics and high noise level in the vehicle, since the impact energy produced by roughness in the road is largely transmitted directly into the vehicle.

A radial tire, in contrast to a conventional or bias constructed tire, does not shorten at the periphery but instead comes into contact with the ground in a manner similar to that of a tractor track which eliminates tread scrubbing.

The presently available radial ply tire is fabricated using steel in both the radial plies as well as in the belt; or alternatively, using nylon or rayon as the ply textile while retaining steel in the belt. The extensive use of steel in the belt prevails throughout the industry, particularly in truck tires. In passenger tires low extensible rayon has been widely used in the belt construction as has glass cord fibers with low extensible materials being used in the radial plies. It is the general thought, however, that a textile such as nylon cannot be used in the belt, or for that matter in the radial plies, because of its greater growth characteristics in comparison to rayon or steel.

While tire strength has been the major measuring tool for assessing a bias contructed tire's theoretical strength potential, two tires of identical calculated strength might perform quite differently both from the standpoint of durability as well as tire wear. These differences in performance indicates that factors other than calculated strength are responsible for these differences. For example, as the number of plies used in a 12 ply rated 10.00–20 truck tire was gradually reduced from 12 to 4, the tire durability did not increase in proportion to the decrease in the tire bulk factor. Furthermore, the reduced ply construction did not appear to decrease in the heat insulative capacity, but instead the durability was drastically adversely affected in most instances by the reduction in the actual number of plies. Furthermore, the absolute wear rate of the tires was adversely affected as the number of plies was reduced.

A comparable situation exists in passenger tires as regards both tire durability and tread wear. The two ply original equipment tire, while possessing the desirable characteristics of enveloping road protusions without rupturing the cord body has not shown a reduction in separation or blow out type failure that was expected with the decrease in body thickness and heat insulative capabilities. Instead, the two ply original equipment tire is inferior to the comparable four ply nylon tire in both durability and tread wear.

The lowering of tire durability and increase in wear rate is also evident in the "economy" type tires which were manufactured during the early and mid 1960's. These tires were mainly of reduced ply and/or reduced cords per inch construction, and while they gave sufficiently high calculated tire strength to warrant their commercial introduction, their actual performance was markedly below the tire engineer's anticipation.

The applicant has previously described deficiencies in nylon bias constructed passenger and truck tires in his copending applications Ser. Nos. 504,768 and 504,769, wherein it was pointed out that nylon was gradually replacing rayon as the principal tire cord in the field of vehicle tires. Several years accumulated data of road test results using truck and passenger tires that were fabricated with nylon tire cords show failure patterns unlike any that were associated with previous tests of rayon or tyrex tire cords. The failure of nylon tire cords may be attributed to nylon fusion. Test data show conclusively that this fusion of the nylon cord is a direct result of the intense heat build-up on the inside of the tire.

Nylon, as used herein, relates to a synthetic textile comprised of a polyamide resin. Rayon relates to a synthetic textile comprised of a modified cellulose filament, including the E.H.M. (extra high modulus) materials.

The problem of nylon fusion is particularly dangerous, in addition to being expensive, for the fusion cannot be detected by one unskilled in the art for the reason that close examination of the tire interior is required to discover the beginning of the fusion process. Usually the occurence of nylon fusion is discovered when the tire has become deteriorated to the point that it simply explodes. The problem is well hidden for it requires several hundred actual road tests by patentee in a carefully controlled testing program to discover this phenomenon, as pointed out in patentee's copending case, Ser. No. 504,768.

The problem is becoming acute and is beginning to result in loss of life and property, for one may be driving along at a low rate of speed in close proximity to pedestrians and experience a sudden and violent tire explosion. This explosion may occur at any speed, after any length of driving, under almost any severity of driving conditions.

There is an area in the shoulder of a tire where a maximum amount of bending or flexing takes place. This area may be very narrow or sharp, depending upon the design and construction features of the tire. In a well designed tire, this flex area is spread over a greater width than in a tire of inferior construction. Discoloration on the interior of the tire develops at this flex area. The intensity of the heat build-up and the sharpness of the flex line control the appearance of the discoloration or heat band which may vary in appearance from a light reddish brown to nearly black and vary in width from one half to 3 inches. In a well designed tire, advanced cases of nylon fusion may cause the two heat bands to become so broad that the two shoulder bands unite in the tire crown, forming a continuous discolored area extending from shoulder to shoulder. In a poorly designed tire these heat bands may be concentrated in a pair of continuous narrow bands which seem to indicate a more intense condition of nylon fusion that will accordingly bring about a more rapid failure.

A tire which indicates excessive heat build-up by the above mentioned heat bands is in a state of advanced deterioration since the nylon cord has undergone some degree of chemical or physical change. Such a tire may continue to run some indeterminate period, but it is only a matter of time until it will explode. Should the heat bands appear late in the tread life, so as to enable the tire to live to be recapped, such a tire would fail prematurely and violently.

Nylon fusion may be attributed to any combination of several factors that result in a chemical or physical change in the plies. One, the nylon cord can be undergoing either a chemical or physical change. Two, the dip coat that acts as the bond between the nylon filaments and the rubber skim compound can be undergoing such a change. Or, three, the rubber compound adjacent to the individual cords can be undergoing a selective aging that results in a hardening of the compound. Any combination of these factors that may cause degradation of the plies is termed nylon fusion. It is known that the nylon cord on the leading edge of the biased cord loses half its tensile strength under some conditions of service which loss may also be a manifestation of the fusion process.

It is evident that the focal point of attack along the flex line starts with the inside ply of a tire in the flex area and that this failure progresses outward through the tire; that is, towards the ply adjacent to the tread. Once the attack starts, it proceeds at an increasingly rapid rate until the internal pressure exceeds the external strength of the tire, whereupon the tire explodes suddenly and without warning, dismembering the tire along the flex line heat band. The nylon apparently loses a large portion of its strength in the band ply with each successive ply losing a little less strength as the deterioration progresses from the inside to the outside of the tire.

A visual study of a number of commercially manufactured pneumatic tires reveals that all tires do not have uniform cord distribution within the individual plies of a tire. Proper cord distribution within a ply in this application is meant the intended direction of a single cord from a bead on one side of the tire up the sidewall, across the shoulder, crown, opposite shoulder, and to the opposite bead to thereby describe a particular line of travel which the tire designer intended the cord to assume. A distorted cord in this application refers to a cord which deviates from this intended line of travel.

In a number of tires which exhibited abnormal force variations, Applicant has discovered that the cord distribution, or angle, in one or more plies deviated a substantial amount from the normal intended path, particularly in the shoulder and upper buttress area. This deviation, or distortion of the cord angle, also sometimes called distortion of the cord planograph, most often occurs in the shoulder of the tire, but in some cases is also noted to continue into the crown of the tire and at times in the sidewall or buttress upper area. The distortion is easy to discover when it is present in the plies adjacent the gas chamber of a tube type tire, however this distortion can occur in one of the remaining plies that are hidden from view and it is therefore impossible to visually observe the hidden defect without first removing one or more plies in order to uncover the defective ply. Where the distortion occurs as a constant deviation of each of the cords of one ply from the intended cord angle, the conicity effect of the tire generally renders the tire unacceptable, or at least less serviceable, since the "wiping wear" necessitates early replacement of the tire. Where the cord angle is distorted in a localized area, and especially if the distortion occurs in the shoulder area, the dynamic stability of the tire in this immediate area increases in non-uniformity in direct proportion to the amount of deviation from the designed angle. This distortion may occur in a manner wherein the cords are seemingly closer together for a limited distance in one of the shoulders of the tire, or the cords may undergo an irregular erratic angle change from the ideal, then again this distortion may be symmetrical in that it may occur in both shoulders of the tire, but with the distorted area not being located on oppositely adjacent sides of the cord and accordingly two different undesirable force variations are introduced into the tire. Such a tire not only wears excessively, but is also dangerous since it deteriorates rapidly and will eventually fail at high speeds.

Distortion of cord angles are more predominant in truck tires than passenger type tires. The more plies required in a tire, and the more tread rubber compound required by the tire, the greater is the problem of cord distortion.

On applicant's copending patent applications, Ser. Nos. 504,424 and 504,767, it was pointed out that the major problem which the automotive tire industry will be confronted with as the use of the presently available radial becomes more widespread in higher power vehicles will be the development of radial cracks in the lower buttress area. When these cracks penetrate through the tire body the tire is rendered useless. This type of failure is literally unknown in Europe, even in the truck tire field, because the above mentioned low power equipment that presently utilized the current radial tire fails to exert enough torque to cause tires to fail for this reason. Since the American automobile carries up to 430 cu. in. displacement and the American trucks often exceed 350 H.P., the present radial tire configuration cannot be successfully operated because of the high mortality rate brought about by the radial cracks. Thus this weakness can overcome all of the other advantages associated with this remarkable tire.

Another common and prevalent type of failure that occurs when radial tires are placed in service on highly powered equipment is the more rapid development of separation between the plies of the steel belt that encompasses the radial plies. Steel tire cord has a very poor adhesive strength ranging from one half to one third of other commercially acceptable tire cord materials. This adhesion defect is aggravated by the increased sheer developed in traction when using high powered equipment and separations in the belt construction result when the force transmitted by the radial cords, and thence to the belt plies becomes intolerable to the belt ply rubber insulating material.

SUMMARY OF THE INVENTION

This invention relates to pneumatic tires and more specifically to improved pneumatic tires which are either of radial or bias construction. The invention is particularly directed to the establishment of highly reinforcing zones at certain critical areas within the tire to thereby more effectively permit the tire to withstand the application of vertical and transverse forces, as well as to a method of establishing specific reinforced zones within the tread contacting portion of the tire to thereby impart improved directional stability into the tire. The invention further comprehends a method of controlling the type of wear pattern which a tire exhibits. These and other desirable attributes are accomplished by regulating the type and size of polygons formed by the superimposition of the cords of one ply upon the cords of an adjacent or near adjacent ply, and by regulating the shear forces existent upon the resulting elastomeric polyhedrons formed between the planes of cords by controlling the size and shape of the polyhedrons.

The invention is most easily practiced by utilization of a narrow width supplementary ply or plies superimposed upon or placed between the prior art plies of rubberized cord comprising the body or carcass of a pneumatic tire in the required strategic area to accomplish the desired performance result.

With the foregoing in mind, it is an object of the present invention to provide an improved pneumatic tire which solves many of the problems inherent in of the prior art bias constructed tires.

Another object of the invention is to provide an improved pneumatic tire which solves the prime problems of separations and radial sidewall cracks of radial type tires.

Another object of the invention is the creation of a new improved type of belted-girdle tire built upon a bias constructed body.

A further object of the present invention is to provide an entirely new type of belted-girdle tire built upon a radial constructed tire carcass.

A still further object of the invention is to provide a mini-ply which imparts rigidity to a tire without increasing the overall bulk thereof in the area or areas where the increased rigidity is required in order for the tire to satisfactorily perform useful work.

A further object of the invention is to provide specific shaped polygons that direct the force flow in the tire cords in a predetermined direction and manner so as to impart a specific type of wear to the tire.

A still further object of the invention is to provide predetermined sized and shaped polyhedrons which in turn regulate the shear characteristics of the tire body in reacting to applied forces.

Another object of the invention is to provide a unidirectional symmetrical tire.

A still further object of the invention is to provide a unidirectional asymmetric tire with a specific degree of sidepull.

Another object of the invention is to enable the manufacture of a tire having a predetermined type of wear across the face of the tread surface.

Still another object of the invention is to enable the construction of extremely thin walled pneumatic tires with added rigidity in the flex area so as to give a rounded hinge point.

A further object of the present invention is to provide a tire having reinforcing strips coextensive with the main body ply with adjacent plies of each reinforcing mini-ply being arranged with respect to each other and to the main body plies to thereby impart predetermined desirable properties into the tire in accordance with the teachings of the present invention.

A still further object of the invention is to permit equivalent or increased reinforcement to be built into a tire with an actual decrease in the bulk of the tire.

A still further object of the invention is to permit an odd number of plies to be employed in the building of a bias constructed tire while still maintaining tire and cord symmetry.

Another object of the invention is to permit an odd number of plies to be employed in the belt or girdle of a belted tire while still maintaining tire and cord symmetry.

A still further object of the invention is to improve the durability of a tire by the provision of a ply located in the shoulder flex area.

An object of the invention is to provide a means of substantially increasing the structural rigidity of a pneumatic tire sidewall without materially increasing the bulk of the sidewall.

The above objects are attained in accordance with the present invention by the provision of reinforcing strips situated exteriorly of or within the body plies and coextensive therewith which add to the structural integrity of the tire. Certain of the above objects of the invention may be realized by control of the size and shape of the polygons and polyhedrons formed by superimposing one ply upon another adjacent ply or plies.

BRIEF DESCRIPTION OF THE DRAWINGS

FIGS. 5a, 5b, and 5c illustrate one form of the resultant forces which are present within the ply structure of FIG. 5, when analyzed in accordance with one of the teachings of the present invention;

FIG. 8 is a schematical representation of the ply cord structure of a pneumatic tire having a ply structure fabricated in accordance with another teaching of the present invention;

FIGS. 9a and 9b comprise a drawing which is similar in many respects to FIG. 8, and wherein another embodiment resulting from practising the present invention is exemplified;

FIG. 10 is a diagrammatical, part schematical, presentation of an asymmetrical tire which has been fabricated according to the present invention;

and FIG. 11 sets forth several other tire constructions which have been fabricated in accordance with the method of the present invention.

DETAILED DESCRIPTION OF THE DRAWINGS

Figure 1:
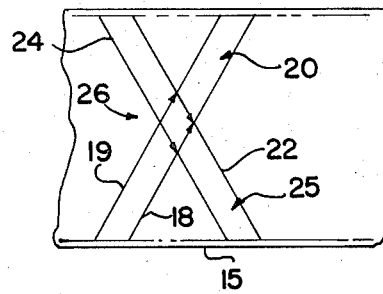
FIG. 1 is a schematical representation of the arrangement of the cords within adjacent plies of a 2 ply tire.

Looking now to the details of the drawings, wherein there is illustrated in FIG. 1 a portion of a tire which is illustrated in a manner as though the beads 15 and 16 have been forced onto a common plane in a manner to reveal the various parallel cords 18 and 19 of the first ply 20 and the parallel cords 22 and 24 of the second bias cut ply 25. The geometrical figure or polygon formed by the intersecting parallel pairs of cords is seen at 26 to be in the form of a parallelogram and wherein the various forces which are applied to various cords forming the polygon 26 is provided with arrows directed in the direction of the applied force, for purposes which will become more apparent as the present disclosure is more fully digested.

Figure 2:
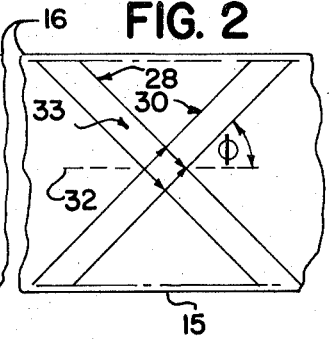
FIG. 2 is a schematical representation, similar to the illustration of FIG. 1, wherein the cord angle lies at a smaller angle with respect to the equatorial plane of the tire, as compared to the illustration of FIG. 1.

Looking now to the details of FIG. 2, wherein a 2 ply tire, identical in most details of construction to the foregoing tire, but wherein the relative angle of the individual cords which comprise each ply 28 and 30 are disposed at a smaller angle with respect to the equatorial axis 32 of the tire. The various cords of FIG. 2 are applied with arrows indicating various applied force, in the same manner as discussed in conjunction with FIG. 1.

Figure 3:
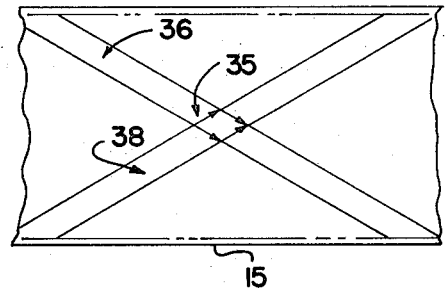
FIG. 3 is similar to FIGS. 1 and 2, wherein the angular displacement of the cords with respect to the equatorial plane of the tire form still a smaller angle.

FIG. 3 sets forth a tire cord study comprised of two adjacent plies of a bias constructed tire wherein a polygon 35 is formed by superimposed parallel pairs of cords 36 and 38 in the same manner described in conjunction with FIGS. 1 and 2, but wherein the cord angle of plies 36 and 38 forms still a smaller angle with respect to the equatorial plane of the tire;

While FIGS. 1, 2, and 3 are drawn as if both plies in each of the illustrations lie in the same plane, it is pointed out that each ply in reality lies in a different plane and as a consequence a form of polyhedron is formed when viewing the models on a three dimensional basis. The direction of the force application of the cords in each plane gives a precise indication of the torsional displacement effects within the individual polyhedrons.

Figure 4:
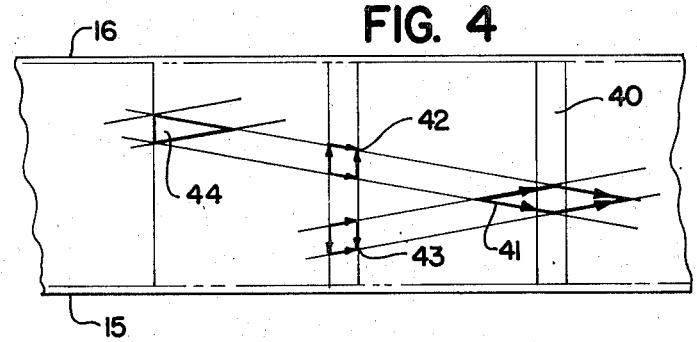
FIG. 4 is similar to the foregoing figures, wherein there is schematically set forth the cord arrangement of a radial ply tire showing the relationship of a 2 ply low angle girdle operatively placed thereon in the usual manner.
Figure 5:
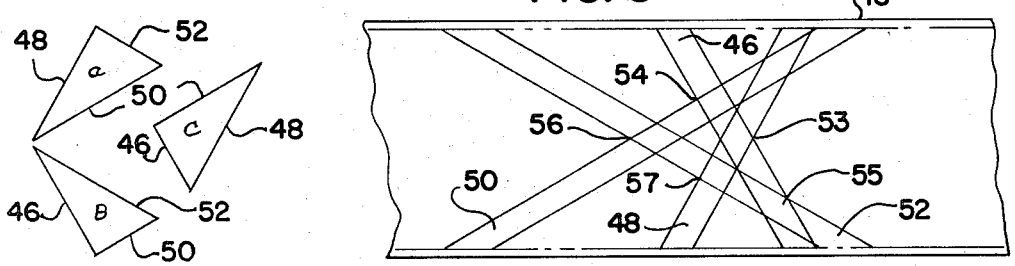
FIG. 5 is similar to FIG. 4, but wherein a 4 ply conventional bias constructed tire is illustrated having adjacent pairs of plies, each placed at a different angle with respect to the equatorial plane of the tire.

FIG. 4 is a schematical representation, such as seen in the foregoing figures, but wherein the two oppositely bias constructed belt plies are imposed upon a radial ply 40 to thereby form various polygons 41, 42, 43, and 44 as well as various polyhedrons. The direction of force which is applied to each individual cord is provided with an arrow;

FIG. 5 is a schematical representation, similar in many respects to the foregoing figures, but wherein a conventional 4 ply bias constructed tire is set forth, with biased cut plies 46 and 48 forming the innermost pair of plies, and with plies 50 and 52 forming an oppositely biased outermost pair of plies. The plies 46 and 48 are symmetrical with respect to each other and form a shorter cord path as measured from bead to bead, and as compared to the longer cord path of the remaining oppositely biased pair of plies 50 and 52. The various geometrical figures, both polygons and polyhedrons, formed by the various intersecting pairs of cords of each ply is generally illustrated by numerals 53 through 58;

FIGS. 5a through 5c show the forces which result from the intersecting lines of indicated force which is applied to individual cords of three ply planes.

Figure 6:
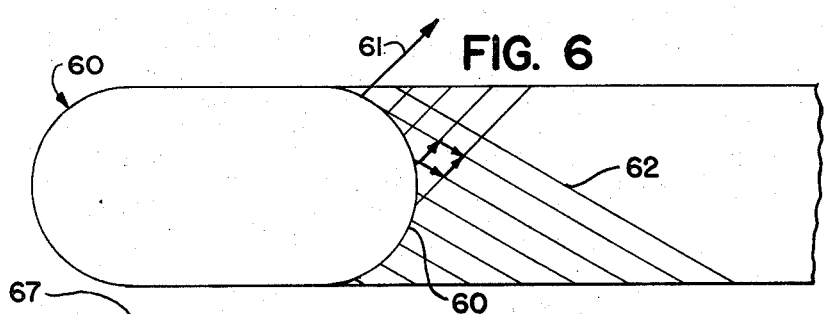
FIG. 6 is a schematical top plan view illustrating various lines of force associated with tire cord structure which includes the footprint of a tire.
Figure 7:
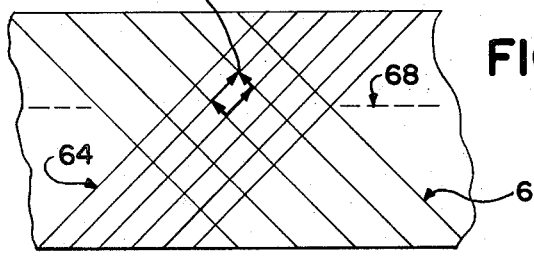
FIG. 7 is a schematical representation which sets forth an asymmetrical tire cord structure fabricated in accordance with the teachings of the present invention.

FIG. 6 is a hypothetical representation of the footprint 60 which is the outline formed by the tread surface of the tire as it rests upon a flat supporting surface, such as the ground. The ply structure is made up of the illustrated cords 61 and 62 with the cord 62 being placed at a lower angle with respect to the equatorial plane, which results in a longer cord as measured from bead to bead. The cords 61 are placed at a greater angle with respect to the equatorial plane of the tire and accordingly are shorter as measured from bead to bead of the tire. One of the cords 61 is provided with an arrow to enable a discussion of the forces which are present in this particular configuration to be better understood later on;

FIG. 7 is more or less a schematical part diagrammatical representation of the structure of a bias constructed tire comprised of plies 64 and 66 which are disposed at equal angles with respect to the equatorial plane 68, and wherein adjacent pairs of cords from each oppositely biased ply forms a polygon (and polyhedron) 67 with the polygon being provided with arrows indicating the lines of force associated therewith. It will be noted that the cords which comprises ply 66 contain a smaller number of cords per inch as compared to the number of cords from which ply 64 is fabricated. It will further be noted that the longest axis of the polygon 67 lies at an angle with respect to the equatorial plane 68.

FIG. 8 sets forth one schematical representation of a tire which enables the practise of the present method to be discussed and wherein there is generally illustrated therein a radially constructed pneumatic tire having a multiplicity of radially disposed cords 70, two oppositely biased low angle plies which forms a girdle or belt at 72, and wherein there is further seen generally illustrated by the arrow at numerals 74 and 76, two oppositely biased spaced apart mini-plies, or ply strips. The radial plies are the innermost plies which sometimes form the air chamber while the spaced apart mini-plies are located at the outermost surface of the main carcass or ply structure. The various polygons and polyhedrons formed by the various superimposed cords are generally illustrated by the numerals 77 through 82, although additional geometrical figures are seen to exist in addition to those specifically set forth by numerals 77 through 82, and wherein the exact configuration of the various other polygons and polyhedrons which are formed or could be formed by considering all of the plies would prove to be an exhaustive study which would merely burden the present application, although it is considered to form a part of the present method set forth herein. It is considered that after reading the remaining portion of this disclosure, others equally skilled in the art will be able to analyze each of the remaining geometrical figures and shapes of FIG. 8, as well as geometrical figures and shapes of any pneumatic tire.

FIGS. 9a and 9b set forth a comparison between the unidirectional symmetrical tire of FIG. 9a as compared to the nondirectional symmetrical tire of FIG. 9b. Numerals 83 represent oppositely biased plies which may be similar to a conventional 2 ply pneumatic tire, or alternatively they may be the last two full plies associated with a pneumatic tire having, for example 12 or more plies. As seen in FIG. 9a, spaced apart mini-plies 84 and 85 are each made up of two superimposed narrow strips of fabric-like material such as known to those skilled in the art of ply composition. It should be understood that more than 2 plies can be utilized at 84 and 85 if desired, and that FIG. 9a and 9b are set forth merely to exemplify one embodiment of a tire which can be fabricated according to the teachings of the present method. As further seen in FIG. 9a the individual cords of mini-ply 85 are comprised of a ply 86 disposed at 45° to the equatorial plane and superimposed upon another ply 87 which is disposed at 60° to the equatorial plane of the tire and wherein the cords of the adjacent plies at 83 are disposed at equal angles with respect to the equatorial plane whereby the included angle thereinbetween are equilvalent to one another. The adjacent plies of the mini-ply 84 are not identical to the cords and plies of mini-ply 85 but instead are mirror images, therefore the force lines (not shown) are not identical in each mini-ply. In the embodiment illustrated in FIG. 9b, mini-plies 84', 85' are likewise built up from adjacent narrow strips of cord reinforced fabric, wherein the cords of adjacent plies 86, 87, are disposed at 45° with respect to the equatorial plane of the tire, and thereby provide a bias constructed mini-ply which is symmetrical in design, since mini-ply 84' is a mirror image of mini-ply 85'. Therefore, mini-ply 84' compared to mini-ply 85' provides a symmetrical structure whichever the direction of rotation of the tire. The construction of tires exemplified by FIG. 9b is a structure which can be best described as a nondirectional, symmetrical pneumatic tire, while the construction of FIG. 9a is best identified as a unidirectional symmetrical construction.

There are many ways of including or imparting asymmetery into a pneumatic tire other than the foregoing expedients and such an expedient is exemplified in FIG. 10, for example, wherein there is generally illustrated in a more or less schematical manner a tire tread footprint 88 which is pressed against the surface of the ground in order to support a vehicle by means of the oppositely biased constructed cords 90 and 92 which cooperate to form the walls of the tire. The innermost ply 90 has been cut longitudinally within the crown area and along its entire circumferentially extending surface such as may be described by the equatorial plane 91 and wherein the edge portions formed by cutting the ply at 91 remain in close abutting relationship to each other where the ply firmly adheres to its adjacent oppositely biased ply 90. Hence it may be said that a cord 92, 92' is a discontinuous cord inasmuch as it has been severed at its midpoint, which is also the equatorial plane 91.

FIG. 11 sets forth several different tire designs or constructions A through G in order to illustrate several different ply structures which may be realized when a pneumatic tire is fabricated in accordance with the teachings of the present method. As seen in FIG. 11a, pairs of spaced apart mini-plies 93, 93' may be located in sandwiched relationship with respect to the innermost ply which forms the air chamber, and wherein the mini-plies are spaced apart from each other and from the spaced apart beads 115, 116. The arrow at numeral 94 merely indicates the location of the tread wearing compound, while the equatorial plane of the tire is illustrated by the dash-dot line 95. The construction of the mini-ply depends upon the desired characteristic which is to be imparted into the tire.

Looking now to FIG. 11b, wherein there is illustrated four mini-plies located on either side of equatorial plane of the tire and wherein this is a total of 8 mini-plies associated with the pneumatic tire. Mini-plies 96 are located near the shoulder area of the tire and are spaced apart by the outermost main ply of the tire, while the pair of mini-plies 97 are located between the shoulder and bead of the tire where they are spaced apart by the subadjacent ply to the air chamber.

FIG. 11c sets forth a pneumatic tire having staggered mini-plies located in sandwiched relationship between adjacent main plies and wherein the staggered relation of the mini-plies offers controlled rigidity to both the shoulder area as well as to the sidewall of the tire.

FIG. 11d sets forth a pair of mini-plies 98 which are located on either side of the equatorial plane of the tire, and wherein the mini-plies are spaced apart by the main plies of the pneumatic tire.

FIG. 11e sets forth three mini-plies which are located on either side of the equatorial plane of the tire, and wherein each mini-ply is spaced apart from one another by a single main ply, and in staggered or overlapping relationship with respect to one another.

FIG. 11f sets forth a structure similar to that seen in FIG. 11E, but wherein the mini-plies are each aligned with respect to each other thereby providing an enlarged or bulky area wherever the mini-plies are located. The bulky area is undesired for most applications of the present method. FIG. 11G is similar to FIG. 11F in that the mini-plies have been grouped together in a manner where they are superimposed on one another, thereby increasing the stiffness of the tire at the expense of bulkiness.

OPERATION

In recent years a great deal of interest has been focused on asymmetric pneumatic tires. Most asymmetric tires are designed to be placed upon the vehicle in a manner to assure that they rotate in only one direction. The purpose of an asymmetric tire resides in its capability of providing a built-in "side pull" which is utilized for improved vehicle handling or stability. Asymmetric tires of the present invention are constructed by using an imbalanced cord design, wherein two different bias cut angle cords have the angles thereof arranged whereby the superimposed cords form quadrilaterals with the long axis of the resulting quadrilaterals in the tread area being placed at an angle with respect to the forward line of travel of the tire. A similar effect may be realized in accordance with the present invention by using identical cut bias angles but wherein a different number of cords per inch are used in adjacent plies. In the first instance the resultant sidepull of the tire is directed toward the direction of the shorter cord, whereas in the second, the motion is in the direction of the greater number of cords per inch. An asymmetric tire can also be built from modifying a basically symmetrical tire merely by cutting the cords in one of the plies along the equitorial axis thereof and in the tread region. This structure results in an imbalance of forces which pulls the tread to one side. The asymmetry is controlled by the location of the cut, either circumferentially along the center line or displaced to one side of the center line, all in a manner as set forth in greater detail elsewhere in this disclosure. Asymmetric tires can also be designed by utilizing an odd number of plies and arranging the respective cord angles in each ply whereby the resolution of forces of the resulting qudrilaterals are imbalanced with respect to the transverse and forward resolutions of forces. This subject is discussed more fully in another part of this specification.

In order to enable others skilled in the art more fully understand the basic relationship existent between the durability and tread wear problems of reduced ply bias constructed tires, the problems of radial cracks and separations at the belt edge and between the belt and radial body of the radial belted type tire, the basic characteristics of an asymmetric tire, and the specific requirements of large aircraft tires, it is considered necessary to first analyze the geometric reinforcing designs obtained by superimposing the cords of one ply upon the cords of an adjacent ply. Since it is impossible to discuss the influence of applied forces upon a pneumatic tire without reference to the reinforcement action of different sized and shaped polygons, and equally impossible to discuss the influence of polygon sizes and shapes upon tire rigidity and stability without reference to the applied forces, the ensuing discussion is intended to clearly set forth this inter-relationship. However, for ease of description and understanding, attention is first directed at the geometry of cord structure prior to determining the effect of force application to this geometry.

The geometry of cord structure of a pneumatic tire, as seen in FIGS. 1 – 5, discloses a top plan view when looking through a tread or sidewall surface, which reveals various cords anchored in different planes of and within a flexible elastomeric matrix which form various shaped and sized polygons 26, 33, and 35 of a discontinuous and curvilinear nature.

The normal bias constructed tire of FIGS. 1 – 3 reveals quadrilateral polygons specifically rhombuses between any two or more plies in juxtaposition. With short cords 20, 25 extending from bead to bead the quadrilaterals are in the shape of a rhombus 26 whose long axis is vertical to the bead 15 or 16. As the cord lengths increase the quadrilateral approaches and finally equals a square configuration as seen in FIG. 2. Further increase in cord length results in the quadrilaterals which are formed by two planes of cords to again become rhombus shaped with the long axis of the rhombus now lying parallel to the beads as best seen in FIG. 3. The rhombus shaped polygons are essentially the same in appearance as viewed through any two or more plies at any point along the tire at equal distances from the bead. Since bias constructed tires are built on a flat drum and then expanded or lofted to their final tire shape, the shape or geometrical configuration of the rhombuses constantly change as one progresses up the tire sidewall toward the tire midcrown. When lofting or forming a multi-ply bias tire wherein three or more pairs of plies are present the cord movements in each ply are not identical; hence, when viewing three or more plies in juxtaposition, polygons of all types can be visually constructed.

A radial belted tire when examined for its geometrical shapes reveals only a parallel series of upright cords 40 in the sidewall. The geometrical shapes formed by the belt are rhombus shaped with the long axis of the rhombus lying parallel to the direction of travel, as seen at 41. When the cords of the bottom ply of the belt are superimposed upon the cords of the top ply of the radial body the long axis of the resulting rhombus lies at an angle to a circumferential line drawn around the tire. When the cords of the two bottom plies of the belt or girdle are superimposed upon the cords of the top ply of the radial body diametrically balancing rhombus are seen along with marked triangulation and many five and six sided polygons. The shapes and sizes of discontinuous polygons formed by superimposing the cords of one plane upon the cords of another plane affect the stiffness or rigidity of the formed rubber product. The more nearly square the resulting rhombus, the greater the stiffness or rigidity imparted. The smaller the size of the inscribed polygon the greater the stiffness or rigidity imparted. Triangular configurations 44 obtained through the use of three plies result in substantially increased stiffness, although the influence of a triangle shaped upon tire stiffness or rigidity is slight and may be completely negligible if the three sides of the triangle are formed from as many as four or more plies of cord because of the vertical distance which separates the sides of the triangle.

Rhombus shapes which are located in a tire sidewall impart varying degrees of resistance to lateral or transverse forces with the greatest resistance resulting from a rhombus which is in the form of a square. The greater the change from a square shape in the sidewall the less will be the ability to resist lateral or transverse forces.

As the cord length increases from bead to bead the tire changes shape from a round to a more boxlike configuration. Vertical forces exert a smaller influence upon tire deflection as the cord length increases because of the formation of rhombuses having a long axis which changes from a relatively perpendicular position with respect to the bead, but which change until the angle of the long axis of the rhombus becomes greater with respect to the vertical line to the bead.

If the change in the rhombus shape occurs in a direction to impart an increase in the length of the long axis in the tread area making contact with the road surface, and if this long axis is parallel to the forward line of travel of the tire, the resistance to lateral or transverse forces is increased. Such rhombus shapes tend to maintain the tire rolling along the road in a straight line. The introduction of triangular shapes also serves to increase the resistance to transverse forces in the contact footprint. Conversely, the greater the angle formed between the long axis of any formed rhombus with the line of travel of the tire, the less is the resistance to transverse forces. Such tires tend to wander from a straight line when travelling down the road.

With an increase in rigidity of the sidewall, particularly in the region undergoing pronounced flexing, the more rounded becomes the angle of band and the more diffuse the heat build up which results as a consequence of any flexing.

Tire cord size has increased markedly since the advent of the reduced ply tire. The prime reason advanced for the two ply bias constructed passenger tire and the four and six ply heavy service truck tire is that these reduced ply tires are thinner and have a lower bulk factor than the corresponding four and 10 or 12 ply tires which they have replaced. In a reduced ply tire, a single large cord having a greater breaking strength is used to replace four smaller cords, each with a lower breaking strength ($1 \times 100$ lbs. vs $4 \times 25$ lbs.) and the resulting lower or reduced ply tires maintain the same calculated strength as the tires having a greater number of plies which they replaced. These reduced ply tires have thinner sidewalls which run at lower effective internal temperatures than their thicker, bulkier predecessors. However, since the larger sized cords of the reduced ply tire also require a heavier gauge of rubber insulation compound and of necessity are spaced wider apart because of their own bulk factor, the resulting polygons formed by superimposing the cords of one ply upon the cords of a second ply are physically larger and the planes of the two plies are located farther apart. Both the increased size of the resulting polygons and the increase in spacing of any two plies with respect to each other contribute to a marked decrease in structural rigidity and stiffness in the sidewall. This decrease in structural rigidity results in a sharper, lower radius bending angle at the edge of the contact footprint and supporting sidewall. This sharp bending angle concentrates the heat generated within a narrow band. Thus, while the effective overall heat generation due to flexing of the tire may be reflected in lower contained air temperatures, the heat intensity at the sharp bend angle is much greater than in a bulkier tire containing a greater number of plies.

Such a higher operating temperature along the more narrow flex line hastens deterioration of the elements of the tire—both oxidative and fatigue— as well as lowering the endurable limits of stress placed upon these elements of the tire, including the cord, cord surface treatment, rubber insulation compound in which the individual cords are placed, and the rubber planar surfaces between plies.

Tires react to forces. A driver's reaction to the tire's reaction to forces is a measure of a tire's stability. A tire's reaction to these forces is a measure of its performance characteristics—its durability, its wear habits, its cracking tendencies. Aggregate applied force can be resolved into its three component forces—forward, transverse, and vertical. Since drivers react differently to the composite effect of these three resoluable forces it is easily understandable why the expression "tire stability" denotes different things to different people. Since the different parameters that describe a tire's work performance capabilities (as differentiated from its aesthetic properties) are each the composite sum of different forward, transverse, and vertical forces, it is understandable that confusion exists as to how to properly categorize a tire.

Vertical Forces

The effect of a vertical force upon a pneumatic tire is to deflect or bend it between the rigid confines of the road surface and the rim of the steel wheel upon which the tire is mounted. The degree of deflection or bending depends upon the magnitude of the vertical force and the flexibility or spring constant of the pneumatic tire itself. The vertial forces exerted upon the tire stem from two sources: 1. the relatively constant downward force or thrust which is governed primarily by the weight and aerodynamic characteristics of the vehicle, and 2. the irregular upward thrust or force which stems from the irregularity of the road contacting surface and the flexibility of the tread contacting surface. These two forces—i.e., the downward force due to the weight of the vehicle and the upward force due to the irregularity of the road surface—affect each other through the flexible connection of the tire sidewalls and the cushioning gaseous chamber. The flexibility or the spring constant of the pneumatic tire represents the composite effects of the tire sidewall rigidity and the inflation pressure of the tire. The term, "spring constant" is used in the strict engineering sense to denote the resistance to deformation exerted against any applied force.

The sidewall rigidity of a pneumatic tire is profoundly affected by the inflation pressure employed within the air chamber. A low iflation pressure causes a greater degree of deflection or bending of the tire sidewall (between the rigid confines of the road contacting surface and the rim of the steel wheel). While both applied load and inflation pressure directly affect the degree of deflection, it should be noted that the spring constant of a tire subjected to a high load and high inflation pressure will be substantially greater than the spring constant of a comparable tire subjected to a lower applied load and lower inflation pressure, even though both tires may have identical degrees of deflection. The sidewall rigidity of a pneumatic tire is also greatly affected by the structural principles employed, that is, the ply structure. Sidewall rigidity may be controlled by either changing the number of plies or by altering the basic construction features; thus, in a radial tire wherein the body cords run straight across the tire from bead to bead in the shortest possible path, thereby resulting in a 90° angle as measured between the path of the cord and the circumferential line of travel of the tire, imparts less resistance to vertical deflection than a bias constructed tire wherein the cords have a longer path and where quadrilateral reinforcing shapes are formed with discontinuous sidelines between two adjacent plies. The rigidity of the sidewall is further influenced by both the size and the shape of the formed polygons as viewed or constructed by superimposing one ply upon the other. The shorter the distance around the polygon, the greater the rigidity; the greater the degree of triangulation, the greater the ridigity; the lesser the distance between the planes of the built up plies which form the polygons, the greater the rigidity.

Vertical forces acting through a pneumatic tire have profound effects upon tire durability as well as upon the aesthetic acceptance of a tire by a consumer. It is well recognized and accepted by the majority of tire users that radial ply tires result in a harsher ride than bias constructed tires. The reason for this is quite evident if the effect of vertical forces upon the two types of tires is examined. Radial tires have a relatively hard, stiff belt or girdle encircling the radial body and the inability of this belt to deform when subjected to a concentrated force (as characterized by a stone on a pavement) results in the impact of the force being transmitted through the belt and then upward through the relatively short, vertical sidewall cords where the force is then transmitted into the metal wheel at a single concentrated point. Unless the suspension system of the vehicle is altered to employ springs of lower constant value, these road forces transmitted through the girdle ultimately reach the human passenger who describes the sensation as "harsh." A bias constructed tire on the other hand has greater flexibility with respect to the road contacting portion of the tread and is therefore able to envelop protruding objects, thereby cushioning the impact force, while the unabsorbed vertical force is transmitted along the relatively long four possible alternate cord paths to intercept the steel wheel at effectively two separate areas. The aesthetic reaction of the driver is one of a softer ride. The influence of a vertical force upon tire durability depends primarily upon the angle of bend occurring within the supporting sidewall between the tread portion of the tire which is firmly anchored on the road surface and the bead portion which is firmly anchored to the metal wheel. The more abrupt or sharper the bend or hinge point occurring within the sidewall as a consequence of the vertical force application, the more profound the effect of the vertical force upon the durability characteristics of the tire. In general, the shorter the cord length as measured from bead to bead within the framework of the physical size of the tire, the greater is the ability to have a more rounded angle, particularly at the juncture point near the edge of the flat footprint and the sidewall of the tire. As the cord gradually lengthens from the anchor point on one bead to the anchor point on the other bead, the angle of the quadrilateral formed by the superimposition of one ply upon the other approaches 90°, and the greater becomes the rigidity. As the cord length increases still further beyond this point the formed quadrilateral assumes a longer circumferentially disposed axis as compared to the radially disposed axis, whereupon the cords approach being parallel to each other with the resultant vertical forces now applied at an angle approaching 90° with respect to the axis of the cord. Such an arrangement imparts greater resistance to vertical deflection forces than a force which is applied directly to the cord axis. Quadrilaterals lying in an axis approaching a parallel condition to a tangent to the tread or bead are also more resistant to vertical forces than these same quadrilaterals approaching parallel condition to the radial axis of the tire. However, a quadrilateral lying on its long axis will result in a sharper bending angle of the sidewall of a tire than will the same quadrilateral standing on end.

An increase in the inflation pressure will not cure the inherent defect of a sharp bending angle, for this expedient merely shifts the hinge point upward or downward. The sharpness of the bend angle is regulated principally by controlling the variation of the size and shape of the polygons formed by superimposition of the cords of one ply upon the cords of one or more other plies, by regulating the distance between the planes of the plies, and by controlling the number of plies required to give the desired degree of stiffness or rigidity necessary to adequately perform the assigned task.

While the foregoing discussion is directed only at the influence of vertical forces upon that portion of the tire are in contact with the road surface and is concerned only with linear motion of the vehicle there is still another vertical force that influences a tire's behavior. This is the vertical force generated as a consequence of a tire's rotation and is related to the angular motion of the tire rotating around an axle. This vertical force is thus vertical to the axis of rotation of the tire rather than being solely vertical to the ground contacting area of the tread footprint arc. The vertical force associated with angular motion of the tire rotating around its axis is resolvable into two forces — centrifugal and centripetal. Centrifugal force acting upon a tire tends to pull the tread off the tire and is balanced by the centripetal force acting upon the tire cord body. This force varies as the square of the linear velocity of the tire tread surface and directly as the radius of the tire so the greater the angular velocity and the larger the tire, the greater is the force. Centrigual force acts primarily upon the surface bend of the tread upon the tire whereas centripetal force acts upon and through the individual cords of the tire body. Both forces act through the entire 360° circumference of the tire. In that portion of the tire tread are impressed upon the ground contacting surface the influence of centrifugal force acting upon the rotating tire is to increase the distance from the axis of rotation to the ground contacting surface thereby lowering the effective load upon the tire. While the actual mass of the vehicle remains constant, the upward thrust of centrifugal force acting on the ground contacting tread arc reduces the bending angle at the juncture of the edge of the tread surface and the tire sidewall.

While polygonic reinforcement of the tire body improves the resistance to centripetal forces, such reinforcement contributes little to the action of centrifugal forces except through slower oxidation of the rubber insulating compound due to lower heat operating levels associated with certain polygon reinforcing shapes.

Lateral or Transverse Forces

The effect of a lateral or transverse force upon tire performance must be gauged upon the property or characteristics being studied. Low magnitude transverse forces result in a shifting of the two beads of the tire with respect to the flat contacting portion of the tread which is anchored to the ground. Hence a stationary car upon being subjected to an extremely strong crosswind will be shifted in the direction of the wind flow or force application. That is, the beads of the tire will be physically shifted laterally with respect to the ground contacting tread portion. Radial tires allow a much greater shift of the beads with respect to the anchored tread surface than bias constructed tires. The relative movement of the beads with respect to the ground contacting tread surface of the tire is the major factor determining a driver's response to "tire stability." When the transverse forces exceed a certain value, the coefficient of friction between the tire tread and road surface is exceeded, or partially exceeded in certain areas of the tread surface, the rate of wear is increased tremendously until such time as traction is lost completely.

While a strong crosswind has been used to illustrate a transverse force, the more normal application of a transverse force is associated with the maneouvering or "steering" of a vehicle from one lane to another or around a corner. When the steering wheel is turned, the steering force is transmitted through the steering mechanism and is manifest as a force which first tends to turn the circumferential axis of the beads with respect to the forward movement of the tire tread. The tire tread attempts to maintain its straight forward movement. The tire sidewalls now represent a flexible hinge or connection between the rigid wheel which is being turned about the vertical axis and the tire tread which is attempting to maintain its forward direction. When the turning force exceeds the tractive force of the tread with respect to the road surface, the direction of travel of the tire is changed. The lag in time between the application of the steering force by the driver and the time when the tire tread responds to this transverse force is a measure of tire stability as defined by some investigators. Bias constructed tires transmit transverse steering forces more quickly than do radially constructed tires. There are two reasons for this, 1. Radial tires form triangular polygons by projection of cord lines through three plies in addition to a rhombus with the long axis running parallel to the line of travel whereas bias constructed tires form only rhombus quadrilaterals with a much shorter long axis. The greater rigidity of the triangular configuration plus the greater length of the formed rhombuses directly underneath the tread portion helps to make the tire tread more resistant to transverse forces than do the shorter length quadrilaterals which characterize conventional bias constructed tires. Thus the road contacting portion of the tread of a belted constructed tire resists changing direction more than does a bias constructed tire where only short length quadrilateral or polygonic structures other than triangles and quadrilaterals are formed by superimposition of the cords of three or more plies with respect to each other.

2. The sidewall of prior art radial tires exhibits no polygonic reinforcement associated with the cord structure — only stiffening due to a multiplicity of plies, wherein all cords are parallel with respect to each other. In a bias constructed tire a stiffening effect is obtained by the presence of the quadrilateral polygons that are inherently formed by superimposing one ply upon the other. The greatest stiffening is obtained when the cord plies are arranged at an angle of 90° with respect to each other. Thus the sidewall of a bias constructed tire has rigidity imparted thereto by the polygonic structures formed therein as well as by the number of plies employed. Therefore, since bias constructed tires have more rigid sidewalls as compared to radial tires, and since their polygonic configuration in the tread area is less rigid than a belted tire, the force imparted into the tire by the steering wheel results in a more rapid response or change in the direction of the forward motion of the tire.

Transverse forces affect tire wear. The greater the rigidity of the sidewall, the greater will be the influence of transverse forces upon wear. Forces which cannot be absorbed, stored, and then redelivered in the form of usable energy must of necessity rupture one of the elements of the tire. The tread surface elements are more apt to be ruptured as a consequence of strong transverse forces resulting from excessive rigidity of the side wall. This rupture is manifest as a faster rate of wear.

While transverse forces normally do not account for more than 10 percent of the total forces to which a tire is subjected in normal service applications, they assume formidable proportions when operating a vehicle on mountainous curving roads at maximum permissible speeds. While the normal power exerted by the rear drive wheels of a high performance compact car may approach 100 horsepower at full load and a speed of 80 miles per hour, the same vehicle negotiating a normal city block curve at 25 miles per hour expends over 1100 horsepower during that portion of time the curve is being circumnavigated.

Forward or backward forces acting upon a tire are the result of torque imparted by the power or brake sources of a vehicle. In a bias constructed tire the torque exerted upon the cord structure is manifested as an extensive force which starts at the anchor point of the cord at the bead where it is then transmitted along the cord to the anchor point where the tread contacts the road surface, with any undelivered energy being transmitted along the cord to which the remaining end is anchored on the opposite bead (or dissipated as an undesirable vibration). The transmitted energy delivered at the contact surface, 60 or 88, where the tread is supported upon the road surface is used in propelling the vehicle forward. In a tire construction employing a long cord 36, 38 (i.e., a low cord angle between the cord and a circumferential line drawn around the tire) a larger reservoir for storing work energy is thus obtained as compared to a tire wherein a shorter cord 20, 25 is employed. Furthermore, any tire cord uses energy and this contributes to the heat build-up within the tire. As the cords approach an angle of 90° with respect to a circumferential line drawn around the tire, such as observed in a belted radial tire, and since the belt cords are not anchored to the bead, the torque force is first transmitted along the cords within the belt or girdle. Ultimately this force must be transmitted through the rubber interface between the belt and radial cords, into the radial cords, and thence into the metal wheel in order to propel the vehicle forward. This transfer of work energy through the rubber cord interfaces places great stresses upon the interfaces and since the greatest strains are apt to occur at the belt edge because the tire also flexes markedly in this area, this area of the tire is especially susceptible to rupture. This rupture will normally be evident as a separation occurring at a cord rubber interface and is most likely to occur first at a point of maximum flexing. The energy not delivered at the tread contact point or dissipated as a traction wave, flows along the trailing edge of the cord into the wheel and is used to increase the kinetic energy of rotation of the wheel assembly.

Thus the flow of energy which is required to propel a vehicle forward originates at the motive source, flows through the tire body, principally the cord structure, with the starting point being the anchor points of the cord around the bead, along the cord, and then delivered through the anchored portion of the tire tread which rests upon the ground surface to propel the vehicle forward. Any undelivered energy not used in propelling the vehicle forward or in increasing the kinetic energy of rotation is evident as a shock wave appearing in the wake of the tire as it leaves contact from the road surface. The work energy is transmitted as a series of force impulses with the total amount of work transmitted being the product of the force impulse or torque times the frequency of the force application. Thus, in order to properly assess the efficiency of a particular type of cord, tire construction, or tire design feature, it is mandatory that a knowledge of the magnitude of the torque force be known as well as the frequency or rapidity with which this force is applied to the individual cord elements (the integrated quantity of work performed). Armed with this knowledge the tire design engineer is better equipped to determine the desirability of transmitting the torque pulse forces through a greater number of smaller channels or through a lesser number of larger channels while still considering the factors of structural support or stiffness as well as their influence upon lateral and vertical force response. Since cord fatigue is a product of the application of cyclic strains of identifiable magnitude along a linear axis plus strains induced by bending, the precise conditions existent in a rotating pneumatic tire in service can be readily duplicated in a laboratory test.

Longitudinal or forward forces within a tire have their greatest influence upon tire durability. They have a negligible influence upon tire stability as measured by individual driver response.

During fabrication a bias constructed tire is expanded or lofted from a barrel-like shape into the final shape which it assumes in the curing operation. This action causes the individual cords to follow a path from one bead, up the sidewall, across the shoulder and crown, and then along the opposite shoulder and crown to the opposite bead. Each cord is anchored to each bead. The path of each cord ideally should follow the shortest possible idealized path associated with the design and lofting of the tire, all of which is discussed more fully in my copending application Ser. No. 631,245. When cords follow a path that differs from their idealized route the rigidity of the area where the cords leave their idealized route is affected since both the size and shape of the resulting polygons are affected. Two polygons of equal size, shape, and area lying adjacent to each other produce a more reinforcing effect than two polygons of equal area, but where one is small and the other large. Thus, the very portion of the tire requiring the greatest degree of reinforcement (the upper buttress and where bending occurs) is frequently the area most affected by irregular cord paths. This is the portion of the tire where the concentration of rubber in the shoulder is the heaviest and where the greatest effect upon disruption of the cord from following its idealized path occurs.

Tires subjected to different service conditions require specific characteristics in order to perform in the best manner possible. Passenger tires require a low spring constant for riding comfort. The sidewall rigidity requirements appear to be more of a matter of aesthetic choice rather than an engineering one unless, as is pointed out in this specification, the angle of bend becomes sufficiently acute so as to adversely affect the tire's durability. Accordingly a passenger tire needs little structural rigidity in the sidewalls since the vertical forces acting upon the sidewall comprise only 10 percent of the total force applications to which the tire is subjected. On the other hand an airplane tire requires extreme sidewall rigidity and an extremely high spring constant in order to satisfactorily support the airplane upon landing. While the precise relationship between forward, transverse and vertical forces acting upon an airplane tire are not known, it is reasonable to expect them to be in the relative ratio of 25 – 5 – 70. Vertical forces acting upon a tread are difficult to assess, for the cord must be sufficiently strong to resist a large shear force or the tread must have sufficient flexibility to envelop protruding objects. In order to provide aircraft tires with a sufficient spring constant to support the weight of the aircraft upon landing, extremely high inflation pressures are commonly employed. This makes the tire essentially a rigid body wherein the cords located in the ground contacting area are extremely susceptible to shear rupture should the tire roll over a small stone on the runway.

The reaction of a tire to forward forces and resistance to transverse forces is extremely important for both passenger and truck tires. The requirement for this characteristic in aircraft tires is only nominal.

Since power is transmitted as a series of cyclic pulses which travel down the individual cord paths it is possible to resolve the force pattern existent at any part of a tire. Looking to FIG. 1 and assuming the direction of rotation as shown, the force pulse exerted upon the cord between the anchor point on the bead and the anchor point at the tread surface against the ground contacting surface is indicated by the directional arrows. In this instance the effective force exerted is directed primarily to the tire shoulder rather than in the line of travel of the tire. A bias tire constructed to show these force lines in the ground contacting area will wear more rapidly on the shoulder ribs and show relatively poor transverse stability. The cord configuration of FIG. 3 on the other hand, shows the major force application in the direction of rotation of the line of travel with a much smaller force thrust directed toward the transverse axis. Such a tire would show negligible shoulder scuffing tendencies.

A symmetrical bias constructed or radial tire will always show a balanced force distribution when resolving all possible polygonic projections. For each force exerted there will be an equal and opposite resisting force. Thus, in the tread contacting area there will be a certain force directed toward a shoulder rib and an equal and opposite force directed toward the opposite shoulder. This is illustrated in FIG. 5. If the line of travel of the tire is considered to be the 0° – 180° line of a compass the resolution of forces directed in the 0° – 180° portion of the compass will be balanced by comparable forces directed in the 180° – 360° portion.

In an asymmetric tire such as illustrated in FIGS. 6, 7, 9a and 10, the resolution of forces may indicate a greater force directed in the 0°–180° portion of the compass than in the 180° – 360° portion, for example. Such a tire will wipe across the tread surface from one shoulder to the other. As a consequence this imbalanced force distribution the tire must have a greater amount of tread rubber on one shoulder than the other since the tread will be worn away on one side of the tire long before the other side wears away. Asymmetric tires may be advantageously employed on pivot, suspension sprung cars where the tires are normally bowed in on the bottom, or on vehicle front ends where toe-in adjustment may not be possible.

I claim:

1. A bias constructed pneumatic tire which includes spaced apart beads, a tread wearing portion, and at least two oppositely biased body plies affixed to the beads and supporting the tread;
   at least one added ply circumferentially disposed for 360° about the tire, said added ply consisting of two mini-plies of parallel cords;
   said mini-plies being spaced radially outwardly of one of said body plies and radially inwardly of the body ply adjacent to said one body ply;
   said mini-plies being spaced from each other on opposite sides of the equatorial plane of the tire;
   each of said mini-plies extending only from under the shoulder area of the tread to approximately the mid-sidewall of the tire.

2. The tire of claim 1, and further including a second added ply circumferentially disposed for 360° about the tire, said second added ply consisting of two mini-plies spaced from each other on opposite sides of the equatorial plane of the tire, the last said added ply being separated from the first said added ply by one of said oppositely biased body plies.

3. The tire of claim 1, and further including another pair of oppositely biased body plies affixed to the beads and contributing to the support of the tread;
   a second added ply circumferentially disposed for 360° about the tire, said second added ply consisting of two mini-plies spaced from each other on opposite sides of the equatorial plane of the tire, the last said added ply being separated from the first said added ply by one of said oppositely biased body plies.

4. The tire of claim 1, and further including a second added ply circumferentially disposed for 360° about the tire, said added ply structure consisting of two mini-plies made of tire cord material, said mini-plies of said second added ply being affixed to the interior of the innermost biased body ply.

5. The tire of claim 1, and further including a second added ply circumferentially disposed for 360° about the tire, said added ply structure consisting of two mini-plies, said mini-plies of said second added ply being affixed to the exterior of the outermost biased body ply.

6. The tire of claim 1, and further including another at least two oppositely biased body plies affixed to the beads and supporting the tread;
   a second added ply circumferentially disposed for 360° about the tire, said second added ply consisting of two mini-plies spaced from each other on opposite sides of the equatorial plane of the tire;
   said first and second added ply being spaced from one another by at least one of said biased body plies.

7. The tire of claim 1 wherein one of said mini-plies is made of two adjacent superimposed oppositely biased plies.

8. The tire of claim 1 wherein one of said mini-plies is made of two adjacent superimposed oppositely biased plies; each of the last said oppositely biased plies having the cords thereof lying at different angles relative to the equatorial plane of the tire.

9. The tire of claim 8 wherein the cords forming the mini-plies on one side of the equatorial plane of the tire form a geometrical figure which is a mirror immage of the geometrical figure formed by the cords of the mini-plies on the remaining side of the equatorial plane of the tire.

* * * * *